US012711203B2

(12) United States Patent
Barkan et al.

(10) Patent No.: US 12,711,203 B2
(45) Date of Patent: Aug. 18, 2026

(54) AUTOMATIC THRESHOLDING FOR CLASSIFICATION MODELS

(71) Applicant: Microsoft Technology Licensing, LLC, Redmond, WA (US)

(72) Inventors: Oren Barkan, Tel Aviv (IL); Avi Caciularu, Tel Aviv (IL); Noam Koenigstein, Tel Aviv (IL); Nir Nice, Salit (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1029 days.

(21) Appl. No.: 17/849,105

(22) Filed: Jun. 24, 2022

(65) Prior Publication Data

US 2023/0418909 A1 Dec. 28, 2023

(51) Int. Cl.
*G06F 18/2415* (2023.01)
*G06F 18/21* (2023.01)
*G06N 20/00* (2019.01)

(52) U.S. Cl.
CPC ........ *G06F 18/2415* (2023.01); *G06F 18/217* (2023.01); *G06N 20/00* (2019.01)

(58) Field of Classification Search
None
See application file for complete search history.

(56) References Cited

U.S. PATENT DOCUMENTS 8,635,172 B1 1/2014 Buryak et al.
8,762,068 B2 * 6/2014 Tammero ............ C12Q 1/6813 435/7.1

(Continued)

FOREIGN PATENT DOCUMENTS

| | | | |
|---|---|---|---|
| CN | 113657455 | A | 11/2021 |
| JP | 2021140484 | A | 9/2021 |
| WO | 2022039012 | A1 | 2/2022 |

OTHER PUBLICATIONS

Wang, et al., "Credible Intervals for Precision and Recall Based on a K-Fold Cross-Validated Beta Distribution", In Journal of Neural Computation, vol. 28, Issue 8, Jul. 27, 2016, pp. 1694-1722.
"International Search Report and Written Opinion Issued in PCT Application No. PCT/US23/022449", Mailed Date: Aug. 30, 2023, 14 Pages.

(Continued)

*Primary Examiner* — Tamara T Kyle
*Assistant Examiner* — Tyler Schallhorn
(74) *Attorney, Agent, or Firm* — Weaver IP L.L.C.

(57) ABSTRACT

Embodiments are described for automatically generating threshold values based on a target metric value that specifies a desired precision or recall performance of an ML model. For instance, a trained ML model is executed against a data set using possible threshold values. Accuracy metric(s) of the ML model is determined based on the execution. Using the accuracy metric(s), evaluation metrics are modeled. A probability that a first modeled evaluation metric value has a relationship with a target metric value is determined. A determination is made that the probability has a relationship with a confidence level. Responsive to determining that the probability has the relationship with the confidence level, the threshold value is added to a set of candidate threshold values. The threshold value from among the set of candidate (Continued)

threshold values is selected by selecting the candidate threshold value associated with the largest second modeled evaluation metric value.

20 Claims, 6 Drawing Sheets

(56) References Cited

U.S. PATENT DOCUMENTS

| | | | | |
|---|---|---|---|---|
| 9,058,308 | B2 | 6/2015 | Shastri et al. | |
| 9,183,226 | B2 | 11/2015 | Yee et al. | |
| 9,330,362 | B2 * | 5/2016 | Bilenko | G06N 20/00 |
| 9,772,741 | B2 * | 9/2017 | Aliferis | G06F 3/0481 |
| 9,818,066 | B1 * | 11/2017 | Rammohan | G06F 16/93 |
| 10,579,928 | B2 | 3/2020 | Wang et al. | |
| 11,100,678 | B2 * | 8/2021 | Yasutomi | G06V 10/454 |
| 11,106,994 | B1 * | 8/2021 | Batalov | G06N 5/04 |
| 11,258,709 | B2 | 2/2022 | Li et al. | |
| 11,488,716 | B2 * | 11/2022 | Bergen | G06N 5/045 |
| 11,494,696 | B2 * | 11/2022 | Yasutomi | G06N 20/00 |
| 11,610,150 | B2 * | 3/2023 | Bergen | G16H 40/20 |
| 12,346,785 | B2 * | 7/2025 | Sghiouer | G06N 5/04 |
| 2011/0021368 | A1 * | 1/2011 | Tammero | G16B 40/10 435/6.12 |
| 2013/0132331 | A1 * | 5/2013 | Kowalczyk | G06N 5/02 706/52 |
| 2014/0279794 | A1 * | 9/2014 | Aliferis | G06N 20/00 706/46 |
| 2014/0344193 | A1 * | 11/2014 | Bilenko | G06N 20/00 706/12 |
| 2017/0032247 | A1 | 2/2017 | Tadesse et al. | |
| 2020/0111024 | A1 * | 4/2020 | Bergen | G06N 20/00 |
| 2020/0111572 | A1 * | 4/2020 | Bergen | G16H 15/00 |
| 2020/0226494 | A1 * | 7/2020 | Yasutomi | G06N 20/00 |
| 2020/0226796 | A1 * | 7/2020 | Yasutomi | G06V 10/454 |
| 2021/0201209 | A1 * | 7/2021 | Sghiouer | G06N 5/04 |
| 2022/0139180 | A1 * | 5/2022 | Jahromi | G08B 13/19613 382/103 |

OTHER PUBLICATIONS

Goutte, et al., "A Probabilistic Interpretation of Precision, Recall and F-Score, with Implication for Evaluation", In Proceedings of the European Conference on Information Retrieval, Mar. 21, 2005, 15 Pages.

Morstatter, et al., "A New Approach to Bot Detection: Striking the Balance Between Precision and Recall", In Proceedings of IEEE/ ACM International Conference on Advances in Social Networks Analysis and Mining, Aug. 18, 2016, pp. 533-540.

Virtanen, et al., "Precision-Recall Balanced Topic Modelling", In Journal of Advances in Neural Information Processing Systems, vol. 32, Dec. 8, 2019, 10 Pages.

* cited by examiner

AUTOMATIC THRESHOLDING FOR CLASSIFICATION MODELS

BACKGROUND

Artificial intelligence has an enormous impact on many aspects of modern society. Machine learning (ML), a subset of artificial intelligence that employs mathematical algorithms to process large data sets, is gaining more popularity in business applications and is increasingly present in consumer products. Deep learning is a branch of machine learning that is based on algorithms used to model high-level abstractions in data. Many applications of artificial intelligence are driven by deep learning, such as natural language processing, speech recognition, and image analysis.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for automatically generating classification threshold values based on a target metric value that specifies a desired precision or recall performance of a machine learning model. For instance, a trained machine learning model is executed against an input data set using possible classification threshold values. One or more accuracy metrics of the trained machine learning model is determined based on the execution. Using the accuracy metric(s), evaluation metrics (e.g., precision and recall) are modeled. A probability that a first modeled evaluation metric value has a first predetermined relationship with a target evaluation metric value is determined. A determination is made that the probability has a second predetermined relationship with a predetermined confidence level. Responsive to determining that the probability has the second predetermined relationship with the predetermined confidence level, the possible classification threshold value is added to a set of candidate classification threshold values. The classification threshold value from among the set of candidate classification threshold values is selected by selecting the candidate classification threshold value associated with the largest second modeled evaluation metric value.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
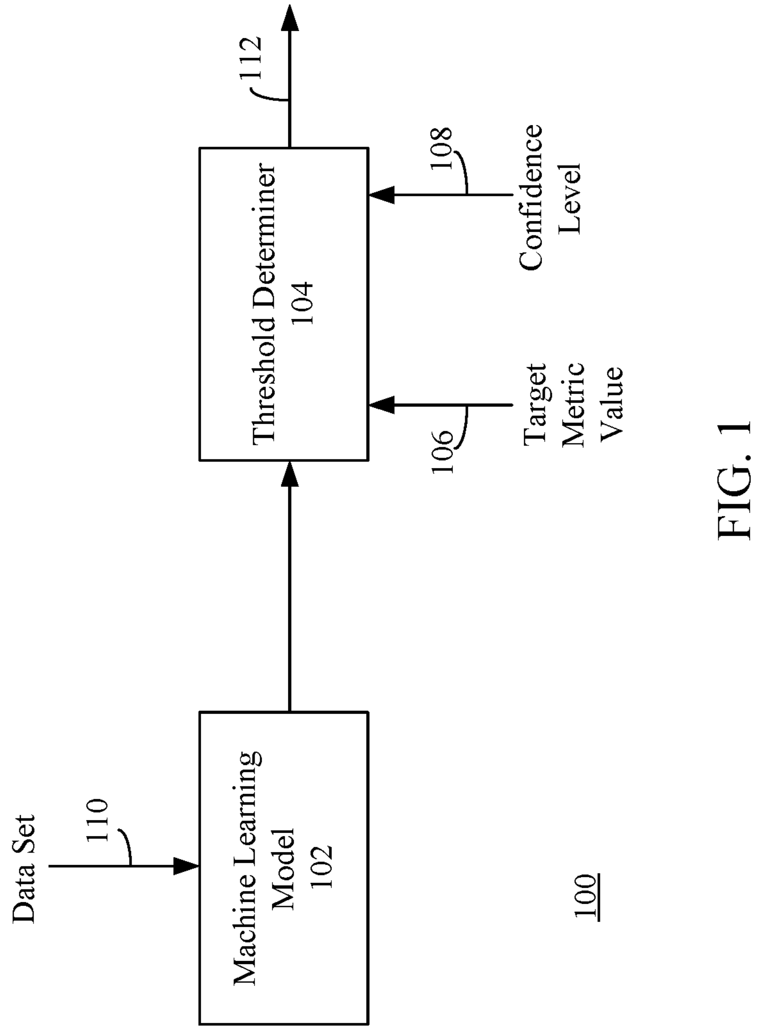
FIG. 1 shows a block diagram of a system for determining classification thresholds for classifications renderable by a machine learning model in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Classification systems automatically generate classifications for data, such as a given image or textual sample. Each classification decision may consist of a value ranging between 0.0 and 1.0. A classification system may output a positive classification decision if the decision meets or exceeds a threshold classification value. For each classification, some may favor high precision over high recall (a better exactness by lowering the false positives), and others may favor higher recall over high precision (higher sensitivity by reducing the false negatives).

The embodiments describe herein are directed to automatically generating classification threshold values based on a target metric value that specifies a desired precision or recall performance of a machine learning model. For instance, a trained machine learning model is executed against an input data set using possible classification threshold values. One or more accuracy metrics of the trained machine learning model is determined based on the execution. Using the accuracy metric(s), evaluation metrics (e.g., precision and recall) are modeled. A probability that a first modeled evaluation metric value has a first predetermined relationship with a target evaluation metric value is determined. A determination is made that the probability has a second predetermined relationship with a predetermined confidence level. Responsive to determining that the probability has the second predetermined relationship with the predetermined confidence level, the possible classification threshold value is added to a set of candidate classification threshold values. The classification threshold value from among the set of candidate classification threshold values is selected by selecting the candidate classification threshold value associated with the largest second modeled evaluation metric value.

The embodiments described here generate more stringent classification threshold values that balance the precision and recall of machine learning models in accordance with the target evaluation metric value. As such, any technological field in which such models are utilized are also advantageously improved. For instance, consider a scenario in which a machine learning model is used in an industrial process, such as predictive maintenance. The ability to predict disruptions to the production line in advance of that disruption taking place is invaluable to the manufacturer. It allows the manager to schedule the downtime at the most advantageous time and eliminate unscheduled downtime. Unscheduled downtime hits the profit margin hard and also can result in the loss of the customer base. It also disrupts the supply chain, causing the carrying of excess stock. A poorly-functioning machine learning model would improperly predict disruptions, and therefore, would inadvertently cause undesired downtimes that disrupt the supply chain.

Consider another scenario in which a machine learning model is used for cybersecurity. The model would predict whether code executing on a computing system is malicious and automatically cause remedial action to occur. A poorly-functioning machine learning model may mistakenly misclassify malicious code, thereby causing the code to compromise the system. By detecting issues in cases where the model performance was affected by the data drift, malicious code may be detected and mitigated, thereby improving the functioning of the computing system. In the absence of such checks, the issue would have gone unnoticed, and the faulty outputs of the model would have been used.

Consider yet another scenario in which a machine learning model is used for autonomous (i.e., self-driving) vehicles. Autonomous vehicles can get into many different situations on the road. If drivers are going to entrust their lives to self-driving cars, they need to be sure that these cars will be ready for any situation. What's more, a vehicle should react to these situations better than a human driver would. A vehicle cannot be limited to handling a few basic scenarios. A vehicle has to learn and adapt to the ever-changing behavior of other vehicles around it. Machine learning algorithms make autonomous vehicles capable of making decisions in real time. This increases safety and trust in autonomous cars. A poorly-functioning machine learning model may misclassify a particular situation in which the vehicle is in, thereby jeopardizing the safety of passengers of the vehicle.

Consider a further scenario in which a machine learning model is used in biotechnology for predicting a patient's vitals, predicting whether a patient has a disease, or analyzing an X-ray or MRI. In case the input data feature distributions change, then the existing model will no longer be adequate and is deemed to be functioning poorly. A poorly-functioning machine learning model may misclassify the vitals and/or the disease or inaccurately analyze an X-ray or MRI. In such a case, the patient may not receive the necessary treatment.

These examples are just a small sampling of technologies that would be improved with more accurate machine learning models. Embodiments for classification threshold value generation based on a target metric value are described as follows.

For instance, FIG. 1 shows a block diagram of a system 100 for determining classification thresholds for classifications renderable by a machine learning model in accordance with an example embodiment. As shown in FIG. 1, system 100 includes a trained machine learning model 102 and a threshold determiner 104.

Trained machine learning model 102 is configured to generate one or more classifications for data provided thereto. For example, trained machine learning model 102 may be configured to generate classification(s) for objects detected in images or video streams or generate classification(s) for various bodies of texts. Examples of classification(s) include, but are not limited to, labels, tags, etc. Machine learning model 102 may be configured to be trained to generate predetermined classification(s) depending on the application. For instance, if machine learning model 102 is configured to recognize animals in images, machine learning model 102 may output the classifications indicating whether a recognized animal is a dog, cat, horse, cow, etc. Each of the classification(s) may be represented as a probability score (e.g., a value between 0.0 and 1.0), where higher the value, the greater the probability that an image comprises a particular animal. Examples of trained machine learning model 102 include, but are not limited to, a neural network-based classification model, a logistic regression-based classification model, random forest-based classification model, etc.

If a classification score for a particular classification meets or exceeds a classification threshold value, then a determination is made that machine learning model 102 has positively predicted the classification. For instance, if the classification threshold value is 0.5 and machine learning model 102 outputs a classification score of 0.7 for a dog classification, then it is determined that machine learning model 102 has predicted that a dog is in the image.

The performance of machine learning model (e.g., machine learning model 102) is typically estimated based on evaluation metrics, such as precision and its complementary metric recall. The precision metric quantifies the number of correct positive predictions (or classifications) made by machine learning model 102 that actually belong to the positive class. The recall metric quantifies the number of positive class predictions made out of all positive examples in the data set. For instance, suppose machine learning model 102 is configured to recognize dogs in an image (i.e., dog is the positive class). Further suppose that the image contains 10 cats and 12 dogs. If machine learning model 102 detects eight dogs, but only five of the detected eight are actually dogs (i.e., there are five true positives and three false positives), the precision metric of machine learning model 102 is 0.625 (i.e., 5/8), and the recall metric is approximately 0.42 (i.e., 5/12).

For any given classification, one might favor high precision over high recall (i.e., a better exactness by lowering the false positives), and others may favor higher recall over high precision (i.e., higher sensitivity by reducing the false negatives). Threshold determiner 104 is configured to generate a classification threshold value 112 for each classification that machine learning model 102 is configured to generate in accordance with a target precision value or target recall value. By doing so, the performance results of machine learning model 102 may be tailored specifically for a user's needs.

For instance, threshold determiner 104 may be configured to receive a target evaluation metric value 106 (i.e., either a target precision value or a target recall value) for a particular evaluation metric and a confidence value 108. Confidence level 108 represents a significance level over the evaluation metric. For example, if the requested evaluation metric value is 0.65, then a significance level of 95% means that threshold determiner 104 determines a classification threshold value that leads to an evaluation metric of 0.65 with a 95% confidence level (i.e., the determined classification threshold value will lead to an evaluation metric of 0.65 95% of the time). Each of target evaluation metric value 106 and confidence value 108 may be specified by a user, for example, via a graphical user interface (GUI) associated with threshold determiner 104.

Threshold determiner 104 is configured to execute machine learning model 102 against an input data set 110 based on target evaluation metric value 106 and confidence value 108 to determine a classification threshold value 112 for each classification renderable by machine learning model 102. Input data set 110 may comprise a plurality of images, a plurality of video streams, bodies of text, etc. Threshold determiner 104 determines classification threshold values 112 by a probabilistic modeling of the recall-precision tradeoff, where classification threshold values 112 are set to balance the precision and recall metrics according to the user's needs. The foregoing techniques may be achieved by adding an uncertainty component via Bayesian modeling, which allows one to choose significance (or confidence) over the target evaluation metric. This advantageously produces better threshold values in small data scenarios, which are very common in real-world multi-label data sets. Threshold determiner 104 also automatically filters out classifications that cannot be guaranteed to obtain target evaluation metric value 106 (due to insufficient statistics). Additional details regarding threshold determiner 104 are provided below with respect to FIG. 2.

Figure 2:
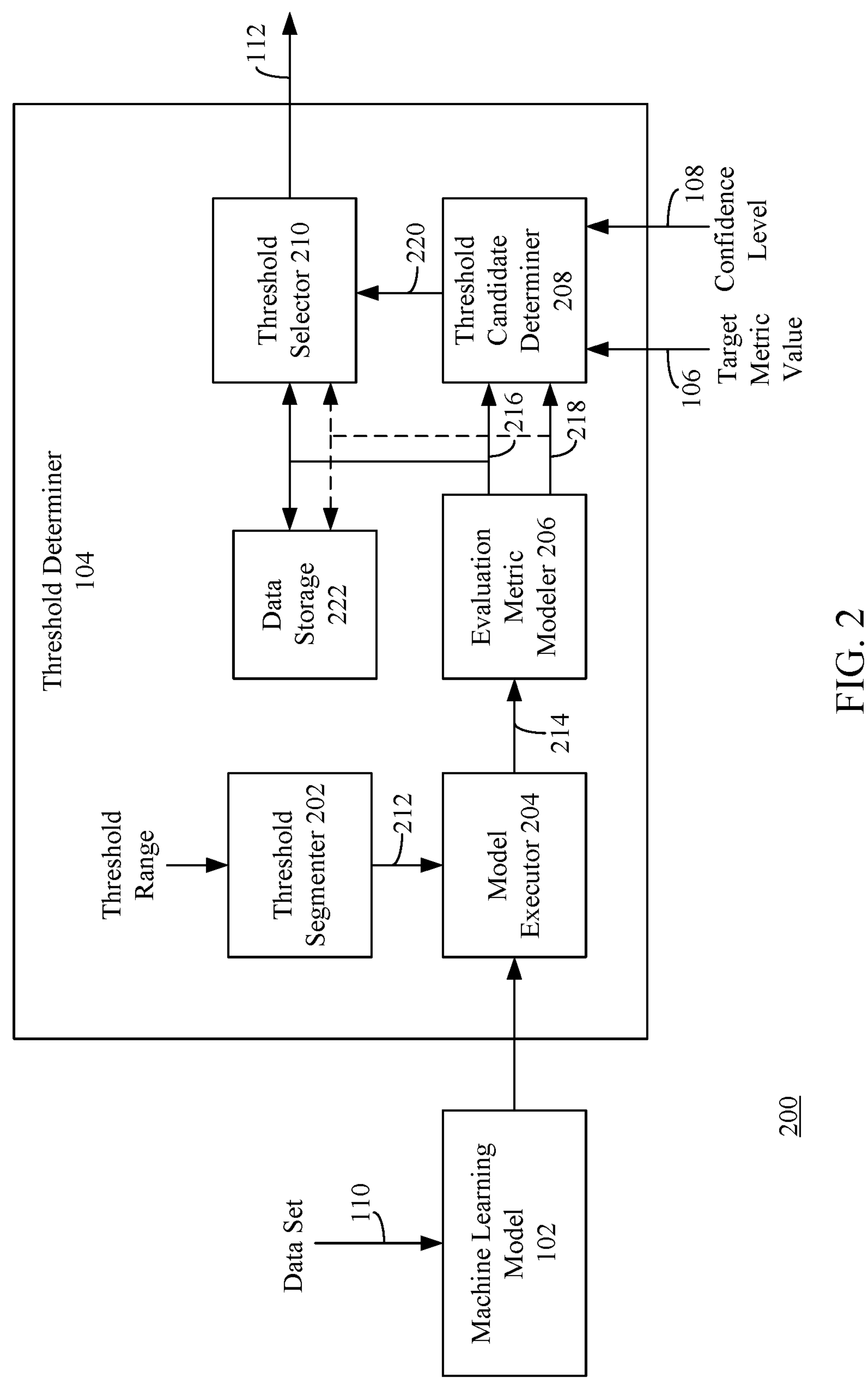
FIG. 2 is a block diagram of a system for determining classification thresholds for classifications renderable by a machine learning model in accordance with another example embodiment.

FIG. 2 is a block diagram of a system 200 for determining classification thresholds for classifications renderable by a machine learning model in accordance with another example embodiment. As shown in FIG. 2, system 200 comprises machine learning model 102 and threshold determiner 104. Threshold determiner 104 may comprise a threshold segmenter 202, a model executor 204, an evaluation metric modeler 206, a threshold candidate determiner 208, a threshold selector 210, and data storage 222.

Threshold segmenter 202 may be configured to determine a plurality of possible classification threshold values 212. For instance, in an embodiment in which a classification threshold value may comprise a threshold range from 0.0 to 1.0, threshold segmenter 202 may segment the range into an N number of classification threshold values 212, where N is a positive value. In an embodiment in which N is equal to 100, a first classification threshold value of possible classification threshold values 212 would be equal to 0.01 (i.e., 1/N), a second classification threshold value of possible classification threshold values 212 would be equal to 0.02 (2/N), and so on and so forth.

Model executor 204 executes trained machine learning model 102 against an input data set 110 using the possible classification threshold value. It is noted that one or more features (e.g., histograms, phonemes, edges, objects, etc.) may be extracted from input data set 110 and such features may be featurized into one or more feature vectors. The feature vector(s) may take any form, such as a numerical, visual and/or textual representation, or may comprise any other suitable form and may be generated using various techniques, such as, but not limited to, time series analysis, keyword featurization, semantic-based featurization, digit count featurization, and/or n-gram-TFIDF featurization.

Input data set 110 may comprise a validation data set that is utilized to validate machine learning model 102 during the training thereof; although the embodiments described herein are not so limited (e.g., input data set 110 may comprise other types of data sets). As is known to persons of ordinary skill in the relevant art(s), a validation data set may be a labeled data set utilized to collect metrics of machine learning model 102 during the training thereof. The metrics are utilized to better train (or tune hyperparameters of) the model (e.g., to prevent the overfitting of the training data set (i.e., the data set utilized to train machine learning model 102)). It is noted that a validation data set is distinguished from both a training data set (which is used to train (or fit) machine learning model 102) and a test data set (which is used to test the efficacy of machine learning model 102 after training and provide an unbiased evaluation of a final model fit on the training data set).

For each possible classification threshold value (also referred herein as a predetermined classification threshold value), based on the execution of machine learning model 102, model executor 204 determines one or more accuracy metrics 214 of trained machine learning model 102. Examples of accuracy metric(s) include, but are not limited to, a number of false positives resulting from execution of machine learning model 102 (e.g., a number of positive classifications made for data set 110 that are incorrect), a number of true positives resulting from execution of machine learning model 102 (e.g., a number of positive classifications made for data set 110 that are correct), and a number of false negatives resulting from execution of machine learning model 102 (e.g., a number of negative classifications made for data set 110 that are incorrect).

Evaluation metric modeler 206 may then model the precision and recall of machine learning model 102 based on the accuracy metric(s) 214 to generate a modeled precision value 218 and a modeled recall value 216. For instance, precision and recall of machine learning model 102 may be defined in accordance with Equations 1 and 2, respectively, which are provided below:

$$p = \frac{TP}{TP + FP} \quad \text{(Equation 1)}$$

$$r = \frac{TP}{TP + FN} \quad \text{(Equation 2)}$$

where p represents the precision, r represents the recall, TP represents the number of true positives, FP represents the number of false positives, and FN represents the number of false negatives for a given execution of machine learning model 102 with respect to a particular classification threshold value of classification threshold values 212.

The likelihood of precision p and recall r given a classification threshold value T may be represented in accordance with Equations 3 and 4, respectively, which is shown below:

$$L(p) = P(T \mid p) \propto P(T \mid p)P(p) \quad \text{(Equation 3)}$$

$$L(r) = P(T \mid r) \propto P(T \mid r)P(r) \quad \text{(Equation 4)}$$

From Bayes rule, the following inferences rules for precision p and recall r may be obtained:

$$P(p \mid T) \propto P(T \mid p)P(p) \quad \text{(Equation 5)}$$

$$P(r \mid T) \propto P(T \mid r)P(r) \quad \text{(Equation 6)}$$

where P(p) is the prior distribution of the precision, and P(r) is the prior distribution of the recall.

Refraining the prior distribution as a Beta distribution yields the following because it is conjugate distribution of the binomial distribution:

$$p \sim \text{Beta}(\lambda, \lambda),\ P(p) = \frac{\Gamma(2\lambda)}{\Gamma(\lambda)} p^{\lambda-1}(1-p)^{\lambda-1} \quad \text{(Equation 7)}$$

$$r \sim \text{Beta}(\lambda, \lambda),\ P(r) = \frac{\Gamma(2\lambda)}{\Gamma(\lambda)} r^{\lambda-1}(1-r)^{\lambda-1} \quad \text{(Equation 8)}$$

where Γ corresponds to the Gamma function. The Beta distribution is a family of continuous probability distributions defined on the interval [0, 1] parameterized by two positive shape parameters, denoted by alpha (α) and beta (β). Note that λ is predetermined hypermeter. In accordance with an embodiment, a symmetrical Beta distribution is utilized because there is no reason to favor greater or lower values of the precision or recall.

Combining Equations 3, 5, and 7 and Equations 4, 6, and 8, respectively, yields the following:

$$P(p \mid T) \propto p^{TP+\lambda-1}(1-p)^{FP+\lambda-1} \quad \text{(Equation 9)}$$

$$P(r \mid T) \propto r^{TP+\lambda-1}(1-r)^{FN+\lambda-1} \quad \text{(Equation 10)}$$

Accordingly, the posterior for precision p and recall r may be obtained as followed:

$$p \mid T \sim Beta(TP + \lambda, FP + \lambda) \quad \text{(Equation 11)}$$

$$r \mid T \sim Beta(TP + \lambda, TN + \lambda) \quad \text{(Equation 12)}$$

Typical choices for λ are 0.5, which is the Jeffreys non-informative prior, or 1, which is the uniform prior and yields an estimation for the mode of precision p and recall r, respectively. The foregoing techniques generate a first probability density function that models the precision p and a second probability density function that models the recall r for a given possible classification threshold value.

In summary, evaluation metric modeler 206 may utilize probabilistic Bayesian modeling to determine modeled precision value 218 and modeled recall value 216. For instance, the precision and recall may be modeled as a posterior of a Beta distribution, where modeled precision value 218 is determined by setting the alpha (α) and beta (β) values to TP+λ and FP+λ, respectively, and where modeled recall value 216 is determined by setting the alpha (α) and beta (β) values to TP+λ and TN+λ, respectively. Modeled precision value 218 and modeled recall precision value 216 determined for possible candidate threshold value 212, as well as the possible candidate threshold value that resulted in modeled precision value 218 and modeled recall precision value 216, may be stored in association with each other in data storage 222, which may be any type of physical memory and/or storage device (or portion thereof) that is described herein, and/or as would be understood by a person of skill in the relevant art(s) having the benefit of this disclosure.

Threshold candidate determiner 208 may then determine a probability that the modeled evaluation metric specified by the user (e.g., either modeled precision metric 218 or modeled recall metric 216) has a predetermined relationship with target evaluation metric value 106 set therefor. For instance, in a scenario in which the targeted metric is precision, threshold candidate determiner 208 may determine the probability that modeled precision value 218 meets or exceeds target metric value 106 (i.e., the target value set for the precision). In a scenario in which the targeted metric is recall, threshold candidate determiner 208 may determine the probability that modeled recall value 216 meets or exceeds target metric value 106 (i.e., the target value set for the recall).

Threshold candidate determiner 208 also determines whether the determined probability has a predetermined relationship with confidence level 108. For instance, threshold candidate determiner 208 may determine whether the probability meets or exceeds confidence level 108.

Responsive to determining that the probability has a predetermined relationship with confidence level 108, the possible classification threshold value being analyzed is added to a set of candidate classification threshold values 220. The foregoing process is performed for each possible classification threshold value 212, where a possible classification threshold value is added to the set if the probability that the target evaluation metric modeled (using the possible classification threshold value) meeting or exceeding the target evaluation metric value meets or exceeds the confidence level. For instance, suppose the user would like to find an approximate 95% credible classification threshold value that results in a precision of 0.7 (i.e., confidence level 108 is set to 0.95 and target metric value 106 is set to 0.7), threshold candidate determiner 208 may perform the following calculation:

$$\int_0^{d_T} \text{Beta}(TP+\lambda, FP+\lambda) = 1 - 0.95 = 0.5 \quad \text{(Equation 13)}$$

In other words, the area of the probability density function that models the precision p is determined. Candidate threshold values of possible candidate threshold values 212 that are added to set 220 are the ones that sustain $d_T<p$.

In another example, suppose the user would like to find an approximate 85% credible classification threshold value that results in a recall of 0.6 (i.e., confidence level 108 is set to 0.85 and target metric value 106 is set to 0.6), threshold candidate determiner 208 may perform the following calculation:

$$\int_0^{d_T} \text{Beta}(TP+\lambda, FN+\lambda) = 1 - 0.85 = 0.15 \quad \text{(Equation 14)}$$

In other words, the area of the probability density function that models the recall r is determined. Candidate threshold values of possible candidate threshold values 212 that are added to set 220 are the ones that sustain $d_T<r$.

To determine which candidate classification threshold values of set 220 should be utilized as classification threshold value 112, threshold selector 210 selects a candidate classification threshold value from set 220 that is associated with the largest complementary metric value. For instance, as shown in FIG. 2, if the target evaluation metric is precision, then threshold selector 210 determines a candidate classification threshold value from the set that maximizes the recall (i.e., the largest modeled recall value of modeled recall values 216 that were generated during the analysis of possible candidate threshold values 212 is determined). For instance, threshold selector 210 may query data storage 222 for each modeled recall value 216 that is associated with the candidate threshold values included in set 220 and determine which candidate threshold value resulted in the largest modeled recall value of modeled recall values 216). Similarly, if the target evaluation metric is recall, then threshold selector 210 determines a candidate classification threshold value from set 220 that maximizes the precision (i.e., the largest modeled precision value of modeled precision values 218 that were generated during the analysis of possible candidate threshold values 212 is determined). For instance, threshold selector 210 may query data storage 222 for each modeled precision value 218 that is associated with the candidate threshold values included in set 220 and determine which candidate threshold value resulted in the largest modeled precision value of modeled precision values 218).

The determined classification threshold value 112 for each classification renderable by machine learning model 102 may be provided to the user, for example, via a GUI, for acceptance thereby. Alternatively, threshold selector 210 may automatically set the determined classification threshold values 112 automatically. In the event that a threshold selector 210 is not able to determine a classification threshold value that meets target metric value 106 and/or confidence level 108, threshold selector 210 may output an error message, for example, to the user via the GUI. Responsive to receiving the error message, a new target metric value and/or confidence level may be selected, for example, by the user, or automatically, and the analysis described above is performed again with the newly-set target metric value and/or confidence level.

The foregoing techniques may be performed for each classification that may be generated by machine learning model 102, thereby resulting in a classification threshold value determined for each possible classification. After classification threshold values 112 are set for each classification, machine learning model 102 may be executed utilizing the determined classification threshold values 112 to perform classifications for data sets provided thereto.

Figure 3:
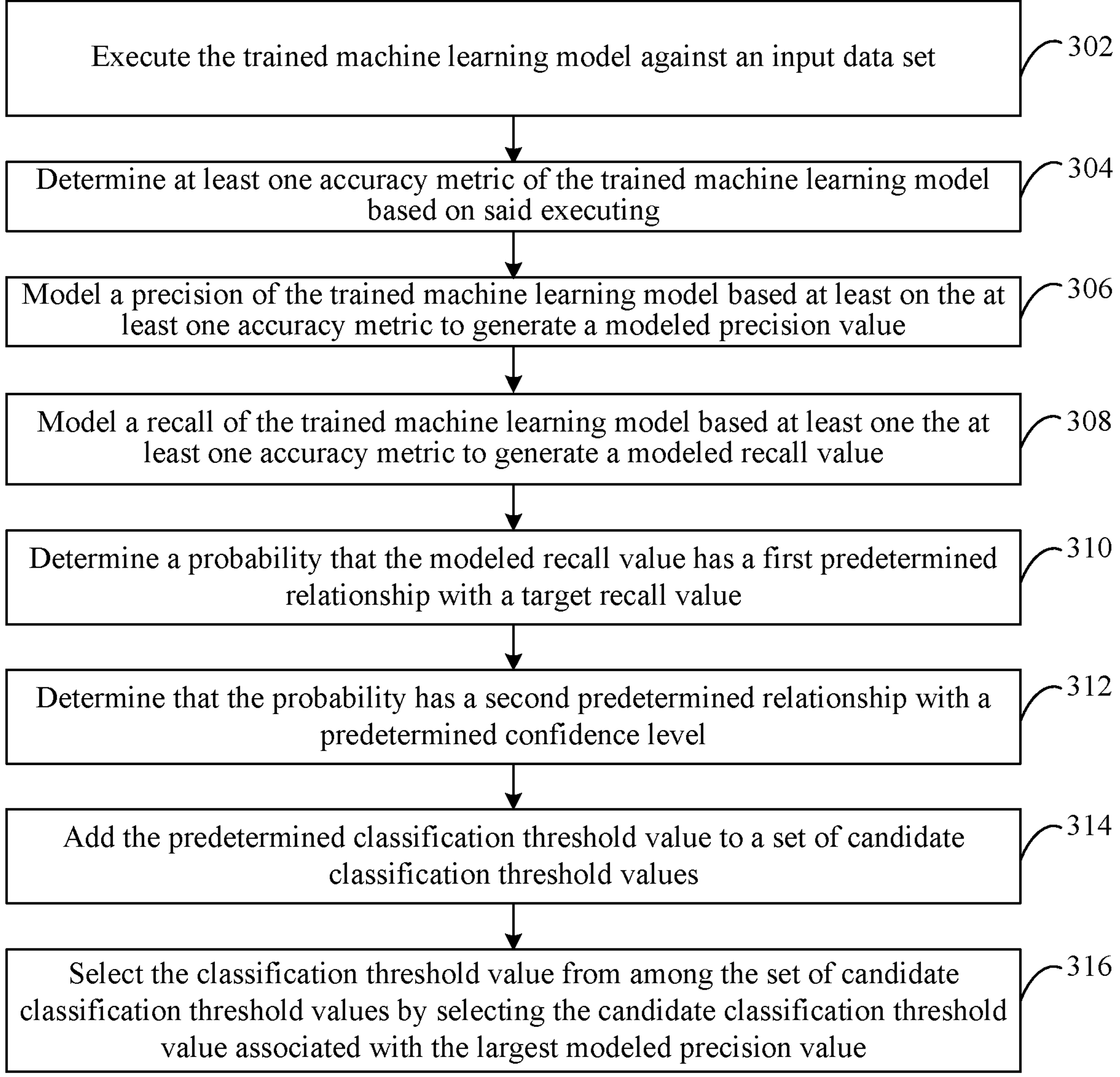
FIG. 3 shows a flowchart of a method for determining a classification threshold for a classification threshold value usable to control a classification decision rendered by a trained machine learning model based on a target recall value in accordance with example embodiment.

Accordingly, a classification threshold for a classification threshold value usable to control a classification decision rendered by a trained machine learning model may be determined in many ways. For instance, FIG. 3 shows a flowchart 300 of a method for determining a classification threshold for a classification threshold value usable to control a classification decision rendered by a trained machine learning model based on a target recall value in accordance with example embodiment. In an embodiment, flowchart 300 may be implemented by system 200, as described in FIG. 2. Accordingly, flowchart 300 will be described with continued reference to FIG. 2. Other structural and operational embodiments will be apparent to persons skilled in the relevant art(s) based on the following discussion regarding flowchart 300 and system 200.

As shown in FIG. 3, the method of flowchart 300 begins at step 302. At step 302, the trained machine learning model is executed against an input data set. For example, with reference to FIG. 3, model executor 204 executes trained machine learning model 102 against data set 110.

In accordance with one or more embodiments, the input data set is a validation data set utilized to validate the machine learning model during training thereof. For example, with reference to FIG. 2, data set 110 is a validation data set to validate machine learning model 102 during training thereof.

Steps 304-314 are performed for each of a plurality of predetermined classification threshold values usable to control the classification decision rendered by a trained machine learning model (e.g., trained machine learning model 102, as shown in FIG. 2). As shown in FIG. 2, threshold segmenter 202 may determine a plurality of predetermined classification threshold values 212. For instance, in an embodiment in which a classification threshold value may comprise a threshold range from 0.0 to 1.0, threshold segmenter 202 may segment the range into an N number of classification threshold values 212, where N is a positive value. Model executor 204 is configured to receive predetermined classification threshold values 212.

At step 304, at least one accuracy metric of the trained machine learning model is determined based on said executing. For example, with reference to FIG. 2, model executor 204 determines at least one accuracy metric 214 of trained machine learning model 102 based on execution thereof.

In accordance with one or more embodiments, the at least one accuracy metric comprises one or more of a number of true positives of the trained machine learning model resulting during execution against the input data set, a number of false positives of the trained machine learning model resulting during execution against the input data set, or a number of false negatives of the trained machine learning model resulting during execution against the input data set. For example, with reference to FIG. 2, accuracy metric 214 comprises one or more of a number of true positives of trained machine learning model 102 resulting during execution against data set 110, a number of false positives of trained machine learning model 102 resulting during execution against data set 110, or a number of false negatives of trained machine learning model 102 resulting during execution against data set 110.

At step 306, a precision of the trained machine learning model is modeled based at least on the at least one accuracy metric to generate a modeled precision value. For example, with reference to FIG. 2, evaluation metric modeler 206 models the precision of trained machine learning model 102 based at least on the at least one accuracy metric 214 to generate a modeled precision value 218.

In accordance with one or more embodiments, the precision is modeled by generating a first probability density function of a first beta distribution based on the number of true positives and the number of false positives, the first probability density function representing the modeled precision value. For example, with reference to FIG. 2, evaluation metric modeler 206 is configured to generate a first probability density function of a first beta distribution based on the number of true positives and the number of false positives (represented by accuracy metrics 214), the first probability density function representing modeled precision value 218. Evaluation metric modeler 206 may generate the first probability density function in accordance with Equation 11, as described above.

At step 308, a recall of the trained machine learning is modeled based at least on the at least one accuracy metric to generate a modeled recall value. For example, with reference to FIG. 2, evaluation metric modeler 206 models the recall of trained machine learning model 102 based at least on the at least one accuracy metric 214 to generate a modeled recall value 216.

In accordance with one or more embodiments, the recall is modeled by generating a second probability density function of a second beta distribution based on the number of true positives and the number of false negatives, the second probability density function representing the modeled recall value. For example, with reference to FIG. 2, evaluation metric modeler 206 is configured to generate a second probability density function of a second beta distribution based on the number of true positives and the number of false negatives (represented by accuracy metrics 214), the second probability density function representing modeled recall value 216. Evaluation metric modeler 206 may generate the second probability density function in accordance with Equation 12, as described above.

At step 310, a probability that the modeled recall value has a first predetermined relationship with a target recall value is determined. For example, with reference to FIG. 2, threshold candidate determiner 208 determines a probability that modeled recall value 216 has a first predetermined relationship with a target recall value (e.g., target metric value 106).

In accordance with one or more embodiments, determining the probability that the modeled recall value has a first predetermined relationship with the target recall value comprises one of determining the probability that the modeled recall value meets the target recall value or determining the probability that the modeled recall value exceeds the target recall value. For example, with reference to FIG. 2, threshold candidate determiner 208 may determine a probability that modeled recall value 216 meets target metric value 106 or a probability that modeled recall value 216 exceeds target metric value 106.

At step 312, a determination is made that the probability has a second predetermined relationship with a predetermined confidence level. For example, with reference to FIG. 2, threshold candidate determiner 208 determines that the probability has a second predetermined relationship with confidence level 108.

In accordance with one or more embodiments, determining that the probability has a second predetermined relationship with the predetermined confidence level comprises determining that the probability meets the predetermined confidence level or determining that the probability exceeds the predetermined confidence level. For example, with reference to FIG. 2, threshold candidate determiner 208 may determine that the probability meets confidence level 108 or may determine that the probability exceeds confidence level 108.

In accordance with one or more embodiments, at least one of the target recall value or the predetermined confidence level is specified via a user interface. For example, with reference to FIG. 2, at least one of target metric value 106 or confidence level 108 are user-specified values that are specified via a user interface of threshold determiner 104.

At step 314, the predetermined classification threshold value is added to a set of candidate classification threshold values. For example, with reference to FIG. 2, threshold candidate determiner 208 adds the predetermined classification threshold value to set 220.

As described above, steps 304-314 are repeated for each predetermined classification threshold value of predetermined classification threshold values 212. As such, the set of candidate classification threshold values may comprise one or more candidate classification threshold values, as more than predetermined classification threshold value may achieve the target recall value.

At step 316, the classification threshold value is selected from among the set of candidate threshold values is selected by selecting the candidate classification threshold value associated with the largest modeled precision value. For example, with reference to FIG. 2, threshold selector 210 selects the classification threshold value from among set 220 by selecting the candidate classification threshold value from set 220 that is associated with the largest modeled precision value of modeled precision values 218.

Figure 4:
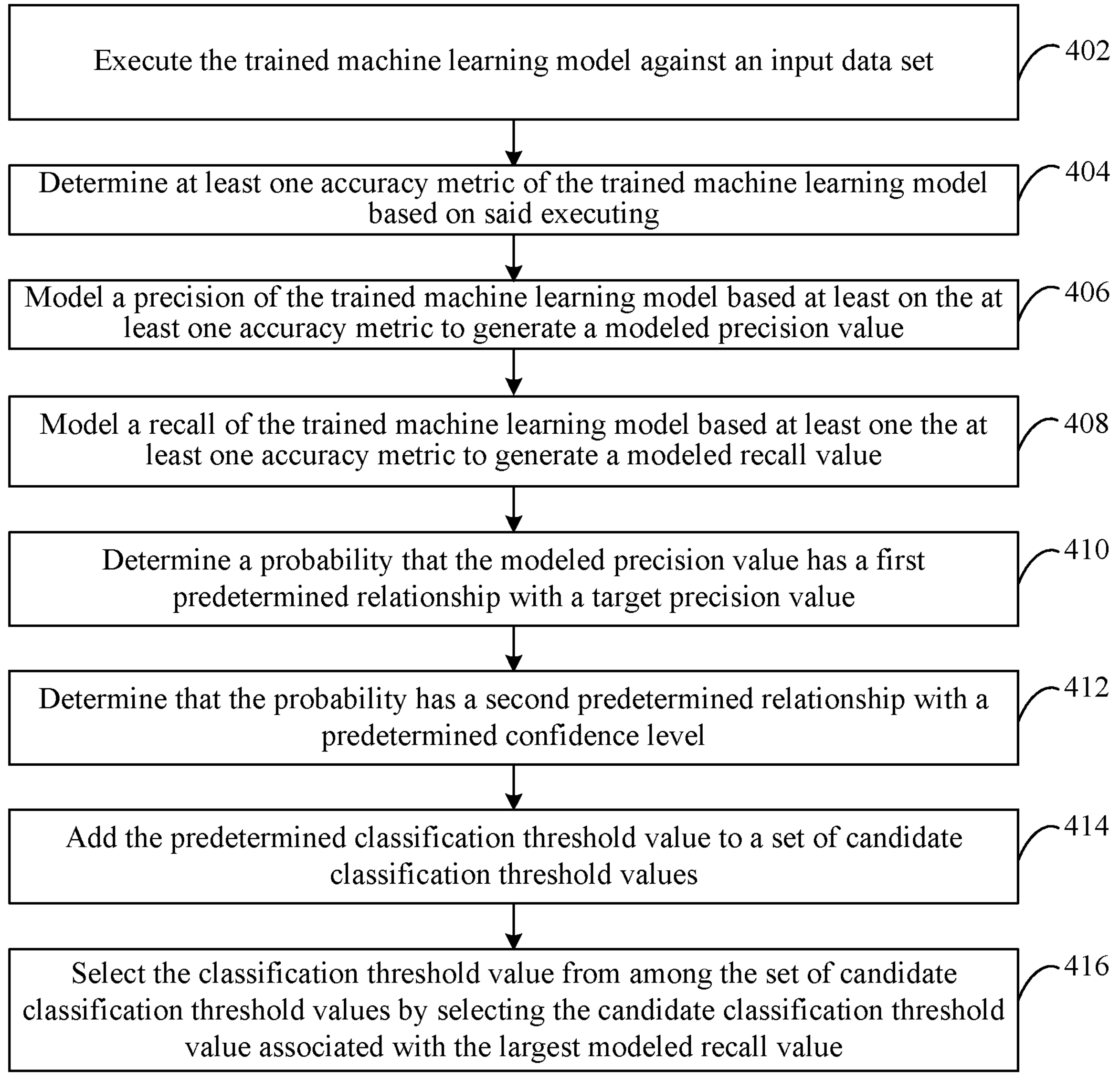
FIG. 4 shows a flowchart of a method for determining a classification threshold for a classification threshold value usable to control a classification decision rendered by a trained machine learning model based on a target precision value in accordance with example embodiment.

FIG. 4 shows a flowchart 400 of a method for determining a classification threshold for a classification threshold value usable to control a classification decision rendered by a trained machine learning model based on a target precision value in accordance with example embodiment. In an embodiment, flowchart 400 may be implemented by system 200, as described in FIG. 2. Accordingly, flowchart 400 will be described with continued reference to FIG. 2. Other structural and operational embodiments will be apparent to persons skilled in the relevant art(s) based on the following discussion regarding flowchart 400 and system 200.

As shown in FIG. 4, the method of flowchart 400 begins at step 402. At step 402, the trained machine learning model is executed against an input data set. For example, with reference to FIG. 4, model executor 204 executes trained machine learning model 102 against data set 110.

In accordance with one or more embodiments, the input data set is a validation data set utilized to validate the machine learning model during training thereof. For example, with reference to FIG. 2, data set 110 is a validation data set to validate machine learning model 102 during training thereof.

Steps 404-414 are performed for each of a plurality of predetermined classification threshold values usable to control the classification decision rendered by a trained machine learning model (e.g., trained machine learning model 102, as shown in FIG. 2). As shown in FIG. 2, threshold segmenter 202 may determine a plurality of predetermined classification threshold values 212. For instance, in an embodiment in which a classification threshold value may comprise a threshold range from 0.0 to 1.0, threshold segmenter 202 may segment the range into an N number of classification threshold values 212, where N is a positive value. Model executor 204 is configured to receive predetermined classification threshold values 212.

At step 404, at least one accuracy metric of the trained machine learning model is determined based on said executing. For example, with reference to FIG. 2, model executor 204 determines at least one accuracy metric 214 of trained machine learning model 102 based on execution thereof.

In accordance with one or more embodiments, the at least one accuracy metric comprises one or more of a number of true positives of the trained machine learning model resulting during execution against the input data set, a number of false positives of the trained machine learning model resulting during execution against the input data set, or a number of false negatives of the trained machine learning model resulting during execution against the input data set. For example, with reference to FIG. 2, accuracy metric 214 comprises one or more of a number of true positives of trained machine learning model 102 resulting during execution against data set 110, a number of false positives of trained machine learning model 102 resulting during execution against data set 110, or a number of false negatives of trained machine learning model 102 resulting during execution against data set 110.

At step 406, a precision of the trained machine learning model is modeled based at least on the at least one accuracy metric to generate a modeled precision value. For example, with reference to FIG. 2, evaluation metric modeler 206 models the precision of trained machine learning model 102 based at least on the at least one accuracy metric 214 to generate a modeled precision value 218.

In accordance with one or more embodiments, the precision is modeled by generating a first probability density function of a first beta distribution based on the number of true positives and the number of false positives, the first probability density function representing the modeled precision value. For example, with reference to FIG. 2, evaluation metric modeler 206 is configured to generate a first probability density function of a first beta distribution based on the number of true positives and the number of false positives (represented by accuracy metrics 214), the first probability density function representing modeled precision value 218. Evaluation metric modeler 206 may generate the first probability density function in accordance with Equation 11, as described above.

At step 408, a recall of the trained machine learning is modeled based at least on the at least one accuracy metric to generate a modeled recall value. For example, with reference to FIG. 2, evaluation metric modeler 206 models the recall of trained machine learning model 102 based at least on the at least one accuracy metric 214 to generate a modeled recall value 216.

In accordance with one or more embodiments, the recall is modeled by generating a second probability density function of a second beta distribution based on the number of true positives and the number of false negatives, the second probability density function representing the modeled recall value. For example, with reference to FIG. 2, evaluation metric modeler 206 is configured to generate a second probability density function of a second beta distribution based on the number of true positives and the number of false negatives (represented by accuracy metrics 214), the second probability density function representing modeled recall value 216. Evaluation metric modeler 206 may generate the second probability density function in accordance with Equation 12, as described above.

At step 410, a probability that the modeled precision value has a first predetermined relationship with a target precision value is determined. For example, with reference to FIG. 2, threshold candidate determiner 208 determines a probability that modeled precision value 218 has a first predetermined relationship with a target precision value (e.g., target metric value 106).

In accordance with one or more embodiments, determining the probability that the modeled precision value has a first predetermined relationship with the target precision value comprises one of determining the probability that the modeled precision value meets the target precision value or determining the probability that the modeled precision value exceeds the target precision value. For example, with reference to FIG. 2, threshold candidate determiner 208 may determine a probability that modeled precision value 218 meets target metric value 106 or a probability that modeled precision value 218 exceeds target metric value 106.

At step 412, a determination is made that the probability has a second predetermined relationship with a predetermined confidence level. For example, with reference to FIG. 2, threshold candidate determiner 208 determines that the probability has a second predetermined relationship with confidence level 108.

In accordance with one or more embodiments, determining that the probability has a second predetermined relationship with the predetermined confidence level comprises determining that the probability meets the predetermined confidence level or determining that the probability exceeds the predetermined confidence level. For example, with reference to FIG. 2, threshold candidate determiner 208 may determine that the probability meets confidence level 108 or may determine that the probability exceeds confidence level 108.

In accordance with one or more embodiments, at least one of the target precision value or the predetermined confidence level is specified via a user interface. For example, with reference to FIG. 2, at least one of target metric value 106 or confidence level 108 are user-specified values that are specified via a user interface of threshold determiner 104.

At step 414, the predetermined classification threshold value is added to a set of candidate classification threshold values. For example, with reference to FIG. 2, threshold candidate determiner 208 adds the predetermined classification threshold value to set 220.

As described above, steps 404-414 are repeated for each predetermined classification threshold value of predetermined classification threshold values 212. As such, the set of candidate classification threshold values may comprise one or more candidate classification threshold values, as more than predetermined classification threshold value may achieve the target precision value.

At step 416, the classification threshold value is selected from among the set of candidate threshold values is selected by selecting the candidate classification threshold value associated with the largest modeled recall value. For example, with reference to FIG. 2, threshold selector 210 selects the classification threshold value from among set 220 by selecting the candidate classification threshold value from set 220 that is associated with the largest modeled recall value of modeled recall values 216.

III. Example Mobile and Stationary Device Embodiments

The systems and methods described above in reference to FIGS. 1-4, machine learning model 102, threshold determiner 104, threshold segmenter 202, model executor 204, evaluation metric modeler 206, threshold candidate determiner 208, threshold selector 210, data storage 222, and/or each of the components described therein, and/or flowcharts 300 and/or 400 may be implemented in hardware, or hardware combined with one or both of software and/or firmware. For example, machine learning model 102, threshold determiner 104, threshold segmenter 202, model executor 204, evaluation metric modeler 206, threshold candidate determiner 208, threshold selector 210, and/or each of the components described therein, and/or flowcharts 300 and/or 400 may be each implemented as computer program code/instructions configured to be executed in one or more processors and stored in a computer readable storage medium. Alternatively, machine learning model 102, threshold determiner 104, threshold segmenter 202, model executor 204, evaluation metric modeler 206, threshold candidate determiner 208, threshold selector 210, data storage 222, and/or each of the components described therein, and/or flowcharts 300 and/or 400 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 5:
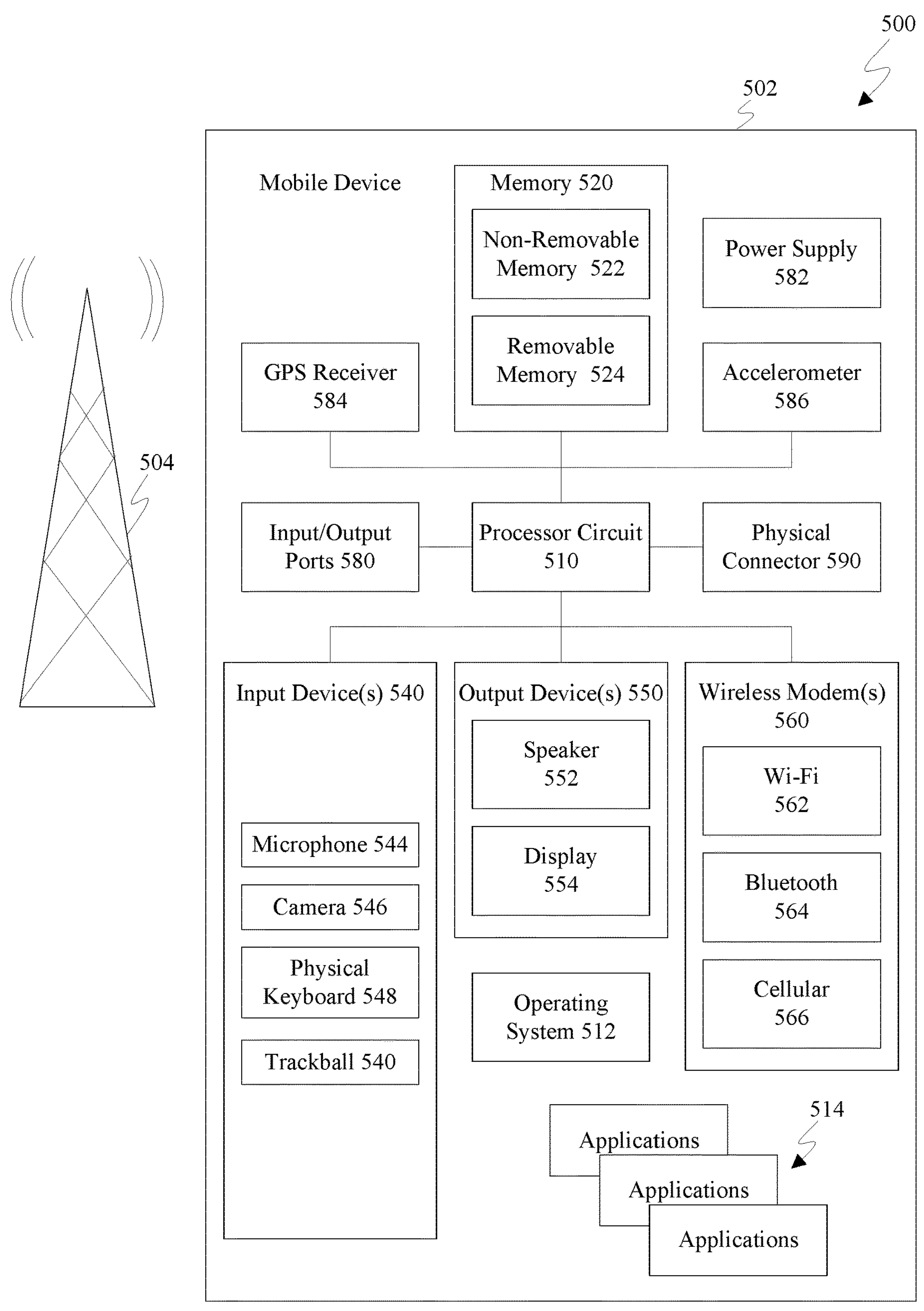
FIG. 5 is a block diagram of an exemplary user device in which embodiments may be implemented.

FIG. 5 shows a block diagram of an exemplary mobile device 500 including a variety of optional hardware and software components, shown generally as components 502. Any number and combination of the features/elements of the systems and methods described above may be implemented as components 502 included in a mobile device embodiment, as well as additional and/or alternative features/elements, as would be known to persons skilled in the relevant art(s). It is noted that any of components 502 can communicate with any other of components 502, although not all connections are shown, for ease of illustration. Mobile device 500 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 504, such as a cellular or satellite network, or with a local area or wide area network.

The illustrated mobile device 500 can include a controller or processor referred to as processor circuit 510 for performing such tasks as signal coding, image processing, data processing, input/output processing, power control, and/or other functions. Processor circuit 510 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 510 may execute program code stored in a computer readable medium, such as program code of one or more applications 514, operating system 512, any program code stored in memory 520, etc. Operating system 512 can control the allocation and usage of the components 502 and support for one or more application programs 514 (a.k.a. applications, "apps", etc.). Application programs 514 can include common mobile computing applications (e.g., email applications, calendars, contact managers, web browsers, messaging applications) and any other computing applications (e.g., word processing applications, mapping applications, media player applications).

As illustrated, mobile device 500 can include memory 520. Memory 520 can include non-removable memory 522 and/or removable memory 524. The non-removable memory 522 can include RAM, ROM, flash memory, a hard disk, or other well-known memory storage technologies. The removable memory 524 can include flash memory or a Subscriber Identity Module (SIM) card, which is well known in GSM communication systems, or other well-known memory storage technologies, such as "smart cards." The memory 520 can be used for storing data and/or code for running operating system 512 and applications 514. Example data can include web pages, text, images, sound files, video data, or other data sets to be sent to and/or received from one or more network servers or other devices via one or more wired or wireless networks. Memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 520. These programs include operating system 512, one or more application programs 514, and other program modules and program data. Examples of such application programs or program modules may include, for example, computer program logic (e.g., computer program code or instructions) for implementing the systems and methods described above, including the embodiments described in reference to FIGS. 1-4, machine learning model 102, threshold determiner 104, threshold segmenter 202, model executor 204, evaluation metric modeler 206, threshold candidate determiner 208, threshold selector 210, and/or each of the components described therein, and/or flowcharts 300 and/or 400.

Mobile device 500 can support one or more input devices 530, such as a touch screen 532, microphone 534, camera 536, physical keyboard 538 and/or trackball 540 and one or more output devices 550, such as a speaker 552 and a display 554.

Other possible output devices (not shown) can include piezoelectric or other haptic output devices. Some devices can serve more than one input/output function. For example, touch screen 532 and display 554 can be combined in a single input/output device. The input devices 530 can include a Natural User Interface (NUI).

Wireless modem(s) 560 can be coupled to antenna(s) (not shown) and can support two-way communications between processor circuit 510 and external devices, as is well understood in the art. The modem(s) 560 are shown generically and can include a cellular modem 566 for communicating with the mobile communication network 504 and/or other radio-based modems (e.g., Bluetooth 564 and/or Wi-Fi 562). Cellular modem 566 may be configured to enable phone calls (and optionally transmit data) according to any suitable communication standard or technology, such as GSM, 3G, 4G, 5G, etc. At least one of the wireless modem(s) 560 is typically configured for communication with one or more cellular networks, such as a GSM network for data and voice communications within a single cellular network, between cellular networks, or between the mobile device and a public switched telephone network (PSTN).

Mobile device 500 can further include at least one input/output port 580, a power supply 582, a satellite navigation system receiver 584, such as a Global Positioning System (GPS) receiver, an accelerometer 586, and/or a physical connector 590, which can be a USB port, IEEE 1394 (FireWire) port, and/or RS-232 port. The illustrated components 502 are not required or all-inclusive, as any components can be not present and other components can be additionally present as would be recognized by one skilled in the art.

Figure 6:
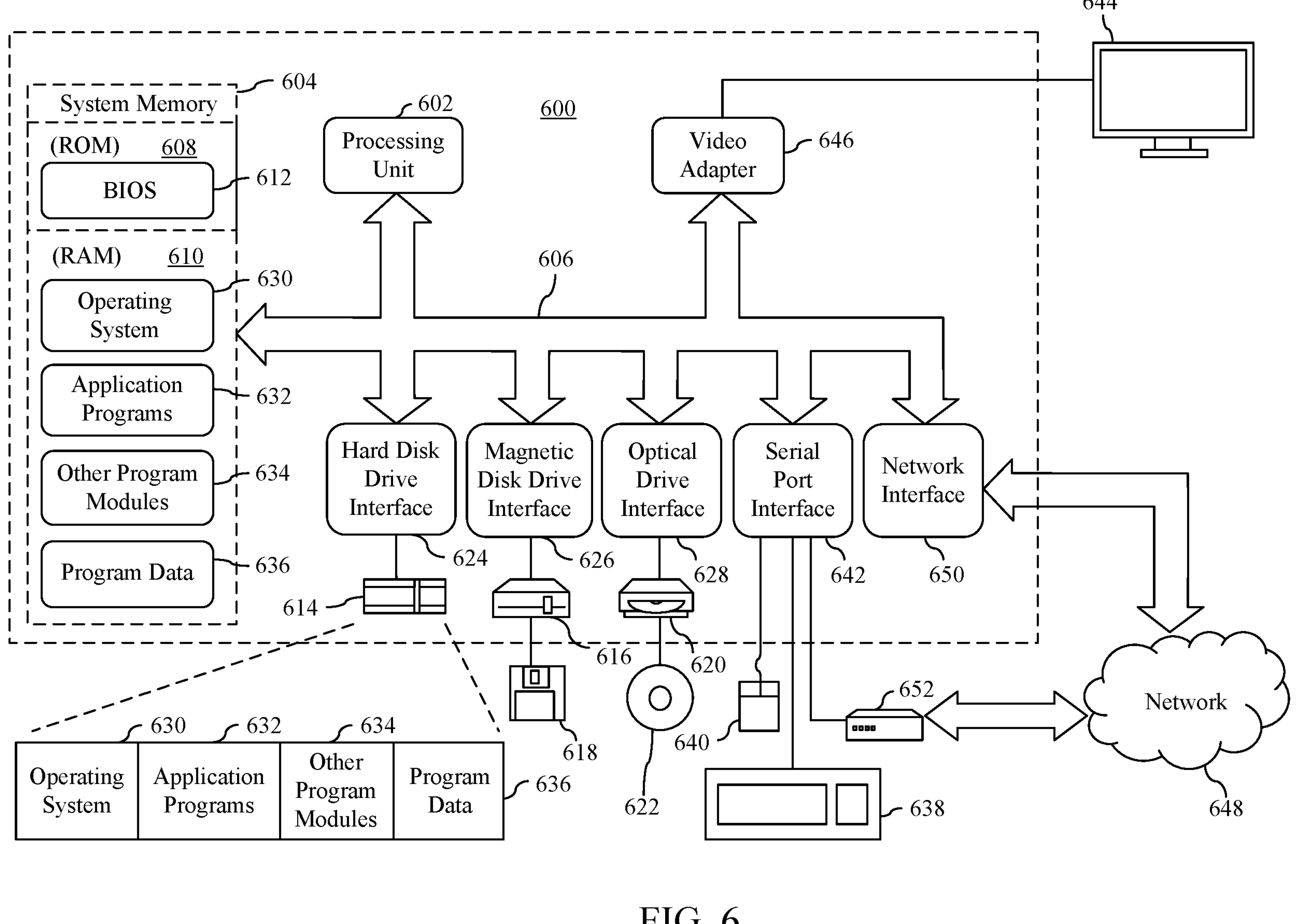
FIG. 6 is a block diagram of an example processor-based computer system that may be used to implement various embodiments.

Furthermore, FIG. 6 depicts an exemplary implementation of a computing device 600 in which embodiments may be implemented. For example, machine learning model 102, threshold determiner 104, threshold segmenter 202, model executor 204, evaluation metric modeler 206, threshold candidate determiner 208, threshold selector 210, data storage 222, and/or each of the components described therein, and/or flowcharts 300 and/or 400 may be implemented in one or more computing devices similar to computing device 600 in stationary or mobile computer embodiments, including one or more features of computing device 600 and/or alternative features. The description of computing device 600 provided herein is provided for purposes of illustration, and is not intended to be limiting. Embodiments may be implemented in further types of computer systems and/or game consoles, etc., as would be known to persons skilled in the relevant art(s).

As shown in FIG. 6, computing device 600 includes one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing the systems and methods described above, including the embodiments described above with reference to FIGS. 1-4.

A user may enter commands and information into the computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to generally refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media (including system memory 604 of FIG. 6). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 652, or any other interface type. Such computer programs, when executed or loaded by an application, enable computing device 600 to implement features of embodiments discussed herein. Accordingly, such computer programs represent controllers of the computing device 600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for selecting a classification threshold value usable to control a classification decision rendered by a trained machine learning model is described herein. The system comprises: at least one processor circuit; and at least one memory that stores program code to be executed by the at least one processor circuit, the program code comprising: a threshold determiner that: executes the trained machine learning model against an input data set; for each of a plurality of predetermined classification threshold values usable to control the classification decision rendered by the trained machine learning model: determines at least one accuracy metric of the trained machine learning model based on said executing; models a precision of the trained machine learning model based at least on the at least one accuracy metric to generate a modeled precision value; models a recall of the trained machine learning model based at least one the at least one accuracy metric to generate a modeled recall value; determines a probability that the modeled recall value has a first predetermined relationship with a target recall value; determines that the probability has a second predetermined relationship with a predetermined confidence level; and responsive to determining that the probability has the second predetermined relationship with the predetermined confidence level, adds the predetermined classification threshold value to a set of candidate classification threshold values; and selects the classification threshold value from among the set of candidate classification threshold values by selecting the candidate classification threshold value associated with the largest modeled precision value.

In an implementation of the foregoing system, the input data set is a validation data set utilized to validate the machine learning model during training thereof.

In an implementation of the foregoing system, at least one of the target recall value or the predetermined confidence level is specified via a user interface.

In an implementation of the foregoing system, the at least one accuracy metric comprises one or more of: a number of true positives of the trained machine learning model resulting during execution against the input data set; a number of false positives of the trained machine learning model resulting during execution against the input data set; or a number of false negatives of the trained machine learning model resulting during execution against the input data set.

In an implementation of the foregoing system, the threshold determiner models the precision of the trained machine learning model based at least on the at least one accuracy metric to generate the first modeled precision value by: generating a first probability density function of a beta distribution based on the number of true positives and the number of false positives, the first probability density function representing the modeled precision value; and modeling the recall of the trained machine learning model based at least on the at least one accuracy metric to generate the modeled recall value comprises: generating a second probability density function of a beta distribution based on the number of true positives and the number of false negatives, the second probability density function representing the modeled recall value.

In an implementation of the foregoing system, the threshold determiner determines the probability that the modeled recall value has the first predetermined relationship with the target recall value by performing one of: determining the probability that the modeled recall value meets the target recall value; or determining the probability that the modeled recall value exceeds the target recall value.

In an implementation of the foregoing system, the threshold determiner determines that the probability has the second predetermined relationship with the predetermined confidence level by performing one of: determining that the probability meets the predetermined confidence level; or determining that the probability exceeds the predetermined confidence level.

A computer-implemented method for selecting a classification threshold value usable to control a classification decision rendered by a trained machine learning model is also disclosed herein. The method includes: executing the trained machine learning model against an input data set; for each of a plurality of predetermined classification threshold values usable to control the classification decision rendered by the trained machine learning model: determining at least one accuracy metric of the trained machine learning model based on said executing; modeling a precision of the trained machine learning model based at least on the at least one accuracy metric to generate a modeled precision value; modeling a recall of the trained machine learning model based at least one the at least one accuracy metric to generate a modeled recall value; determining a probability that the modeled precision value has a first predetermined relationship with a target precision value; determining that the probability has a second predetermined relationship with a predetermined confidence level; and responsive to determining that the probability has the second predetermined relationship with the predetermined confidence level, adding the predetermined classification threshold value to a set of candidate classification threshold values; and selecting the classification threshold value from among the set of candidate classification threshold values by selecting the candidate classification threshold value associated with the largest modeled recall value.

In an implementation of the foregoing method, the input data set is a validation data set utilized to validate the machine learning model during training thereof.

In an implementation of the foregoing method, at least one of the target precision value or the predetermined confidence level is specified via a user interface.

In an implementation of the foregoing method, the at least one accuracy metric comprises one or more of: a number of true positives of the trained machine learning model resulting during execution against the input data set; a number of false positives of the trained machine learning model resulting during execution against the input data set; or a number of false negatives of the trained machine learning model resulting during execution against the input data set.

In an implementation of the foregoing method, modeling the precision of the trained machine learning model based at least on the at least one accuracy metric to generate the first modeled precision value comprises: generating a first probability density function of a beta distribution based on the number of true positives and the number of false positives, the first probability density function representing the modeled precision value; and modeling the recall of the trained machine learning model based at least on the at least one accuracy metric to generate the modeled recall value comprises: generating a second probability density function of a beta distribution based on the number of true positives and the number of false negatives, the second probability density function representing the modeled recall value.

In an implementation of the foregoing method, determining the probability that the modeled precision value has the first predetermined relationship with the target precision value comprises one of: determining the probability that the modeled precision value meets the target precision value; or determining the probability that the modeled precision value exceeds the target precision value.

In an implementation of the foregoing method, determining that the probability has the second predetermined relationship with the predetermined confidence level comprises one of: determining that the probability meets the predetermined confidence level; or determining that the probability exceeds the predetermined confidence level.

A computer-readable storage medium having program instructions recorded thereon that, when executed by at least one processor, perform a method for selecting a classification threshold value usable to control a classification decision rendered by a trained machine learning model is further described herein. The method comprises: executing the trained machine learning model against an input data set; for each of a plurality of predetermined classification threshold values usable to control the classification decision rendered by the trained machine learning model: determining at least one accuracy metric of the trained machine learning model based on said executing; modeling a precision of the trained machine learning model based at least on the at least one accuracy metric to generate a modeled precision value; modeling a recall of the trained machine learning model based at least one the at least one accuracy metric to generate a modeled recall value; determining a probability that the modeled precision value has a first predetermined relationship with a target precision value; determining that the probability has a second predetermined relationship with a predetermined confidence level; and responsive to determining that the probability has the second predetermined relationship with the predetermined confidence level, adding the predetermined classification threshold value to a set of candidate classification threshold values; and selecting the classification threshold value from among the set of candidate classification threshold values by selecting the candidate classification threshold value associated with the largest modeled recall value.

In one implementation of the computer-readable storage medium, the first evaluation metric is one of a precision metric or a recall metric and the second evaluation metric is the other of the precision metric or the recall metric.

In one implementation of the computer-readable storage medium, the input data set is a validation data set utilized to validate the machine learning model during training thereof.

In one implementation of the computer-readable storage medium, the at least one accuracy metric comprises one or more of: a number of true positives of the trained machine learning model resulting during execution against the input data set; a number of false positives of the trained machine learning model resulting during execution against the input data set; or a number of false negatives of the trained machine learning model resulting during execution against the input data set.

In one implementation of the computer-readable storage medium, modeling the first evaluation metric of the trained machine learning model based at least on the at least one accuracy metric to generate the first modeled evaluation metric value comprises: generating a first probability density function of a beta distribution based on the number of true positives and the number of false positives, the first probability density function representing the first modeled evaluation metric value; and modeling the second evaluation metric of the trained machine learning model based at least on the at least one accuracy metric to generate the second modeled evaluation metric value comprises: generating a second probability density function of a beta distribution based on the number of true positives and the number of false negatives, the second probability density function representing the second modeled evaluation metric value.

In one implementation of the computer-readable storage medium, determining the probability that the first modeled evaluation metric value has the first predetermined relationship with the target precision value comprises one of: determining the probability that the first modeled evaluation metric value meets the target evaluation metric value; or determining the probability that the first modeled evaluation metric value exceeds the target evaluation metric value.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for selecting a classification threshold value usable to control a classification decision rendered by a trained machine learning model, comprising:

at least one processor circuit; and at least one memory that stores program code to be executed by the at least one processor circuit, the program code comprising:

a threshold determiner that:

executes the trained machine learning model against an input data set;

for each of a plurality of predetermined classification threshold values usable to control the classification decision rendered by the trained machine learning model:

determines at least one accuracy metric of the trained machine learning model based on said executing;

models a precision of the trained machine learning model by determining a first probability density function of a beta distribution based on a number of true positives and a number of false positives to generate a modeled precision value;

models a recall of the trained machine learning model by determining a second probability density function of a beta distribution based on the number of true positives and a number of false negatives to generate a modeled recall value;

determines a probability that the modeled recall value has a first predetermined relationship with a target recall value;

determines that the probability has a second predetermined relationship with a predetermined confidence level; and responsive to determining that the probability has the second predetermined relationship with the predetermined confidence level, includes the predetermined classification threshold value in a set of candidate classification threshold values;

selects the classification threshold value from among the set of candidate classification threshold values by selecting the candidate classification threshold value associated with the largest modeled precision value; and configures the trained machine learning model to render the classification decision based on a comparison of an output of the trained machine learning model and the selected classification threshold value.

2. The system of claim 1, wherein the input data set is a validation data set utilized to validate the machine learning model during training thereof.

3. The system of claim 1, wherein at least one of the target recall value or the predetermined confidence level is specified via a user interface.

4. The system of claim 1, wherein the at least one accuracy metric comprises one or more of:

the number of true positives of the trained machine learning model resulting during execution against the input data set;

the number of false positives of the trained machine learning model resulting during execution against the input data set; or the number of false negatives of the trained machine learning model resulting during execution against the input data set.

5. The system of claim 1, wherein the threshold determiner determines the probability that the modeled recall value has the first predetermined relationship with the target recall value by performing one of:

determining the probability that the modeled recall value meets the target recall value; or determining the probability that the modeled recall value exceeds the target recall value.

6. The system of claim 1, wherein the threshold determiner determines that the probability has the second predetermined relationship with the predetermined confidence level by performing one of:

determining that the probability meets the predetermined confidence level; or determining that the probability exceeds the predetermined confidence level.

7. The system of claim 1, wherein the first modeled precision value is determined by dividing the number of true positives by a summation of the number of true positives and the number of false positives, and the first modeled recall value is determined by dividing the number of true positives by a summation of the number of true positives and the number of false negatives.

8. A computer-implemented method for selecting a classification threshold value usable to control a classification decision rendered by a trained machine learning model, comprising:

executing the trained machine learning model against an input data set;

for each of a plurality of predetermined classification threshold values usable to control the classification decision rendered by the trained machine learning model:

determining at least one accuracy metric of the trained machine learning model based on said executing;

modeling a precision of the trained machine learning model by determining a first probability density function of a beta distribution based on a number of true positives and a number of false positives to generate a modeled precision value;

modeling a recall of the trained machine learning model by determining a second probability density function of a beta distribution based on the number of true positives and a number of false negatives to generate a modeled recall value;

determining a probability that the modeled precision value has a first predetermined relationship with a target precision value;

determining that the probability has a second predetermined relationship with a predetermined confidence level; and responsive to determining that the probability has the second predetermined relationship with the predetermined confidence level, including the predetermined classification threshold value in a set of candidate classification threshold values;

selecting the classification threshold value from among the set of candidate classification threshold values by selecting the candidate classification threshold value associated with the largest modeled recall value; and configures the trained machine learning model to render the classification decision based on a comparison of an output of the trained machine learning model and the selected classification threshold value.

9. The method of claim 8, wherein the input data set is a validation data set utilized to validate the machine learning model during training thereof.

10. The method of claim 8, wherein at least one of the target precision value or the predetermined confidence level is specified via a user interface.

11. The method of claim 8, wherein the at least one accuracy metric comprises one or more of:

the number of true positives of the trained machine learning model resulting during execution against the input data set;

the number of false positives of the trained machine learning model resulting during execution against the input data set; or the number of false negatives of the trained machine learning model resulting during execution against the input data set.

12. The method of claim 8, wherein determining the probability that the modeled precision value has the first predetermined relationship with the target precision value comprises one of:

determining the probability that the modeled precision value meets the target precision value; or determining the probability that the modeled precision value exceeds the target precision value.

13. The method of claim 8, wherein determining that the probability has the second predetermined relationship with the predetermined confidence level comprises one of:

determining that the probability meets the predetermined confidence level; or determining that the probability exceeds the predetermined confidence level.

14. The method of claim 8, wherein the first modeled precision value is determined by dividing the number of true positives by a summation of the number of true positives and the number of false positives, and the first modeled recall value is determined by dividing the number of true positives by a summation of the number of true positives and the number of false negatives.

15. A computer-readable storage medium having program instructions recorded thereon that, when executed by at least one processor, perform a method for selecting a classification threshold value usable to control a classification decision rendered by a trained machine learning model, the method comprising:

executing the trained machine learning model against an input data set;

for each of a plurality of predetermined classification threshold values usable to control the classification decision rendered by the trained machine learning model:

determining at least one accuracy metric of the trained machine learning model based on said executing;

modeling a first evaluation metric of the trained machine learning model by determining a first probability density function of a beta distribution based on a number of true positives and a number of false positives to generate a first modeled evaluation metric value;

modeling a second evaluation metric of the trained machine learning model by determining a second probability density function of a beta distribution based on the number of true positives and a number of false negatives to generate a second modeled evaluation metric value;

determining a probability that the first modeled evaluation metric value has a first predetermined relationship with a target evaluation metric value;

determining that the probability has a second predetermined relationship with a predetermined confidence level; and responsive to determining that the probability has the second predetermined relationship with the predetermined confidence level, including the predetermined classification threshold value in a set of candidate classification threshold values;

selecting the classification threshold value from among the set of candidate classification threshold values by selecting the candidate classification threshold value associated with the largest second modeled evaluation metric value; and configures the trained machine learning model to render the classification decision based on a comparison of an output of the trained machine learning model and the selected classification threshold value.

16. The computer-readable storage medium of claim 15, wherein the first evaluation metric is one of a precision metric or a recall metric and the second evaluation metric is the other of the precision metric or the recall metric.

17. The computer-readable storage medium of claim 15, wherein the input data set is a validation data set utilized to validate the machine learning model during training thereof.

18. The computer-readable storage medium of claim 15, wherein the at least one accuracy metric comprises one or more of:

the number of true positives of the trained machine learning model resulting during execution against the input data set;

the number of false positives of the trained machine learning model resulting during execution against the input data set; or the number of false negatives of the trained machine learning model resulting during execution against the input data set.

19. The computer-readable storage medium of claim 15, wherein determining the probability that the first modeled evaluation metric value has the first predetermined relationship with the target precision value comprises one of:

determining the probability that the first modeled evaluation metric value meets the target evaluation metric value; or determining the probability that the first modeled evaluation metric value exceeds the target evaluation metric value.

20. The computer-readable storage medium of claim 15, wherein the first modeled precision value is determined by dividing the number of true positives by a summation of the number of true positives and the number of false positives, and the first modeled recall value is determined by dividing the number of true positives by a summation of the number of true positives and the number of false negatives.

* * * * *